March 21, 1961
G. A. WILSON
2,975,680
SEMIAUTOMATIC PISTOL WITH BREECH BLOCK
FORWARD OF MAGAZINE CHAMBER
Filed April 22, 1958
7 Sheets-Sheet 1
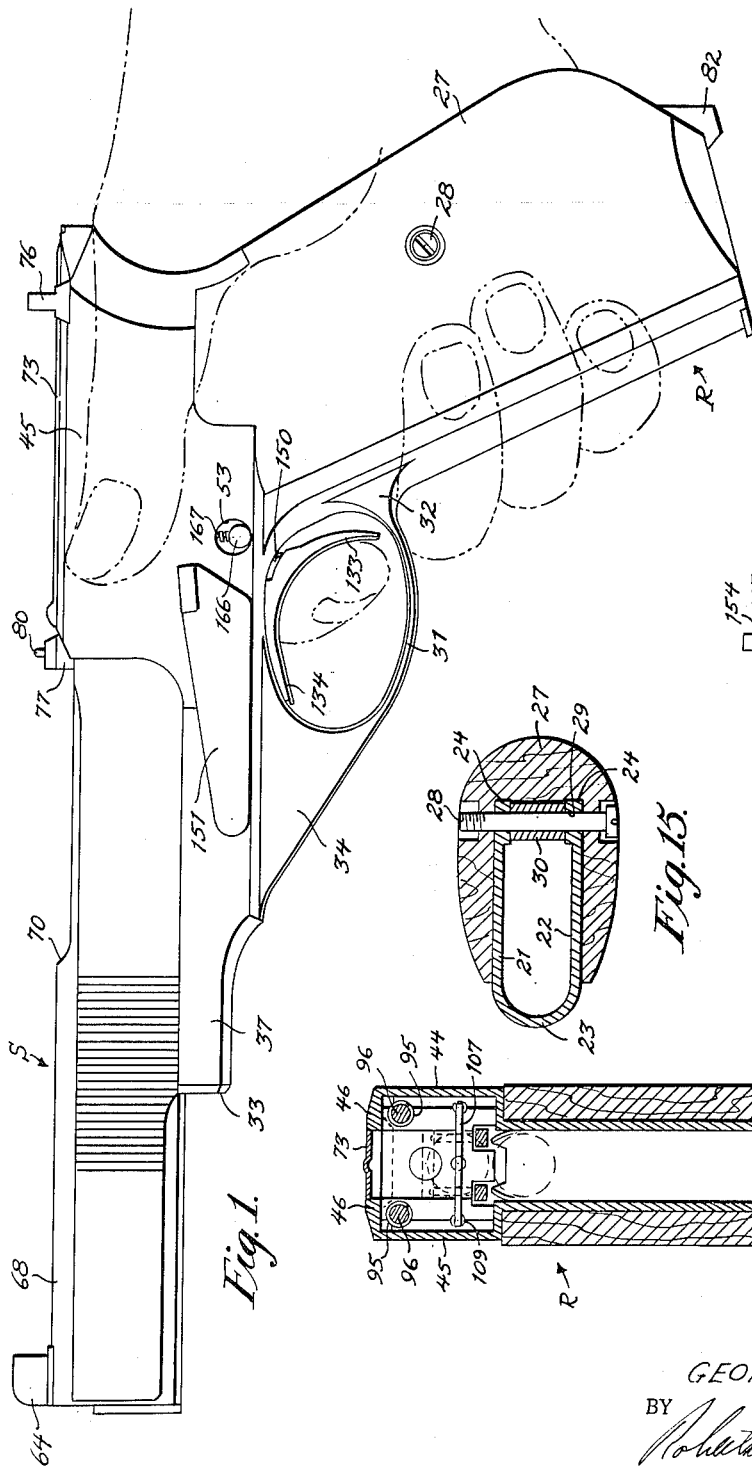
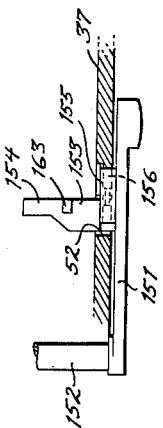
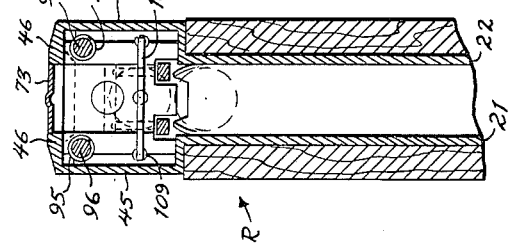
INVENTOR.
GEORGE A. WILSON
BY
Robertson and Youtie
ATTORNEYS.

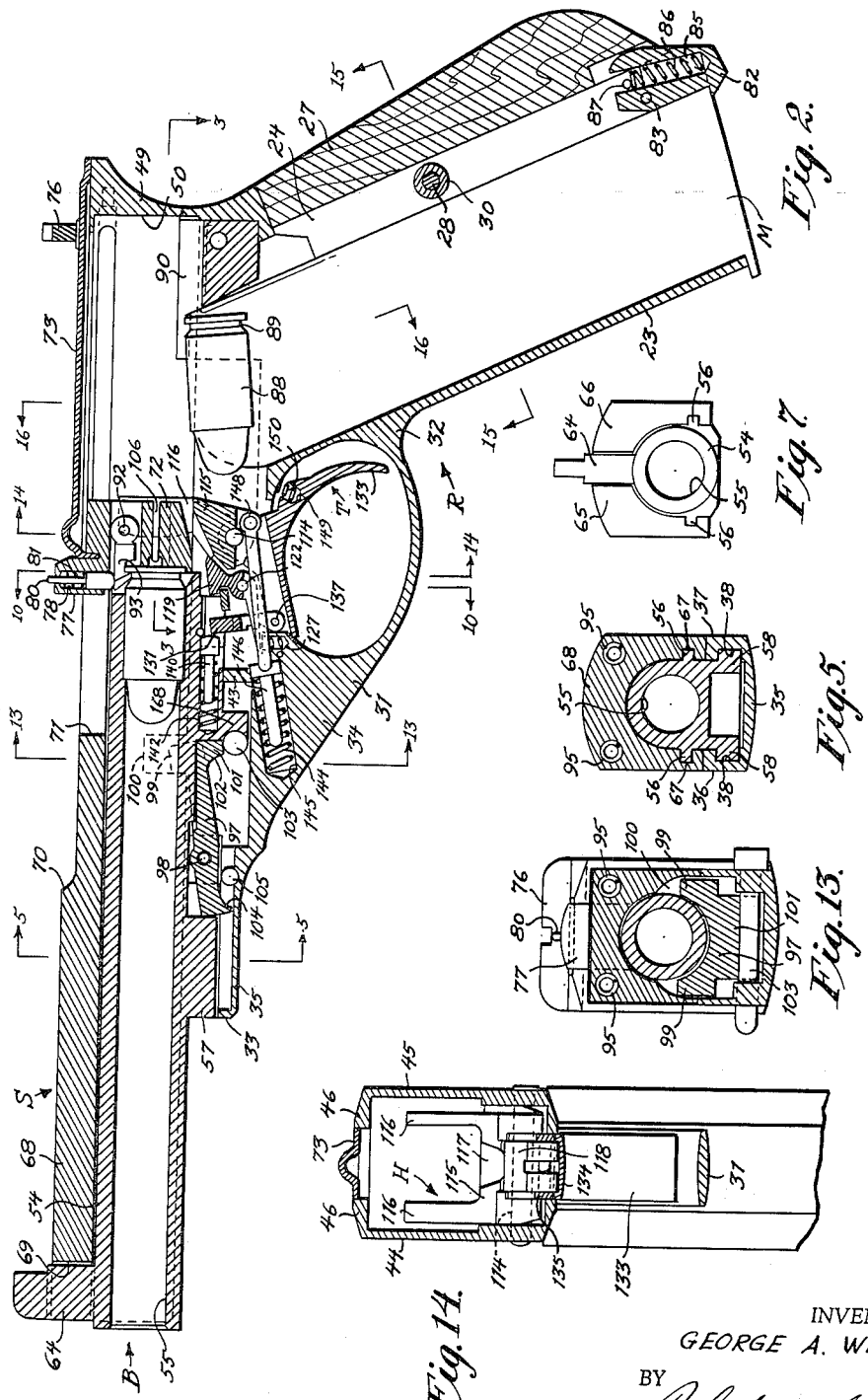

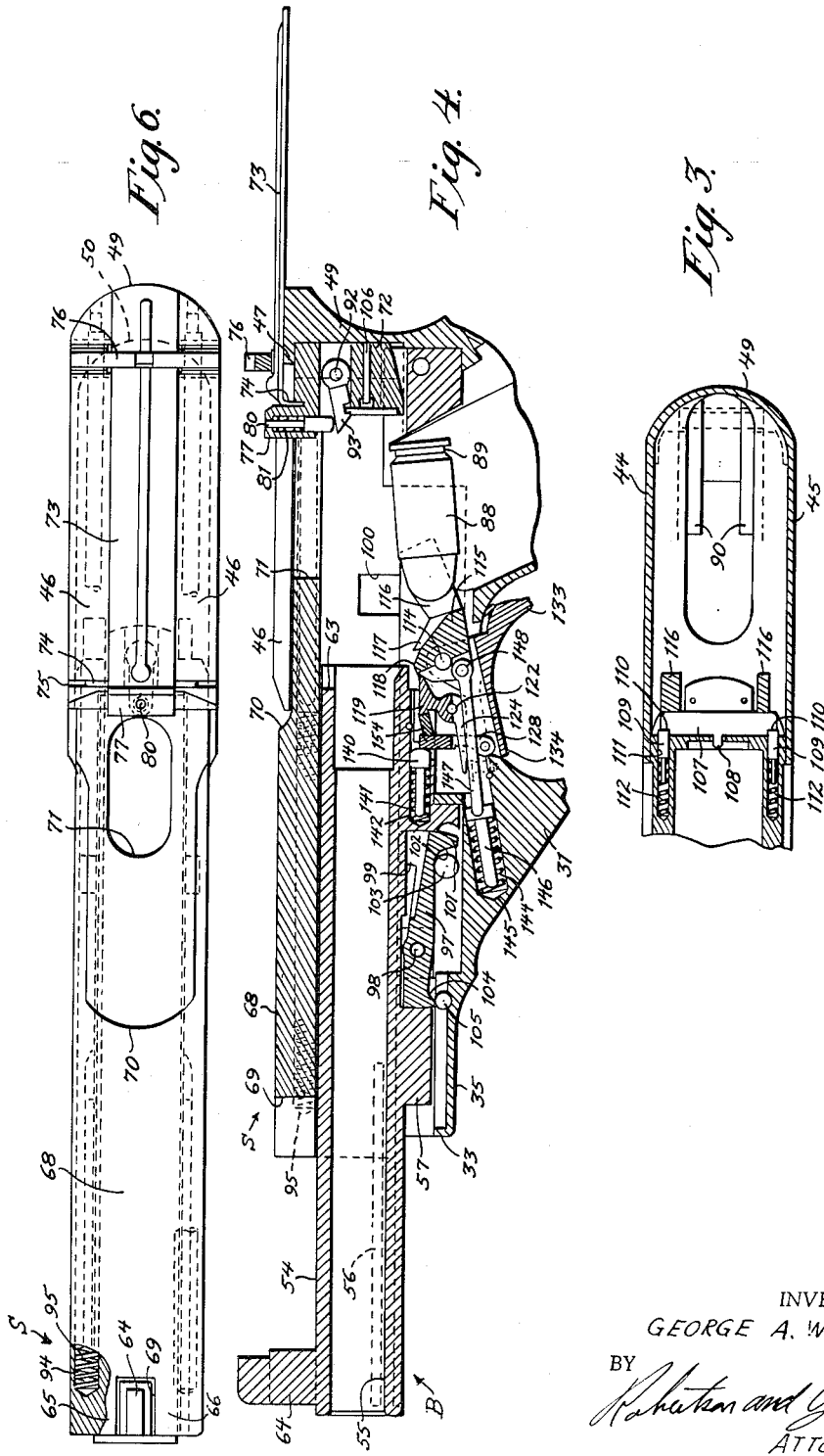

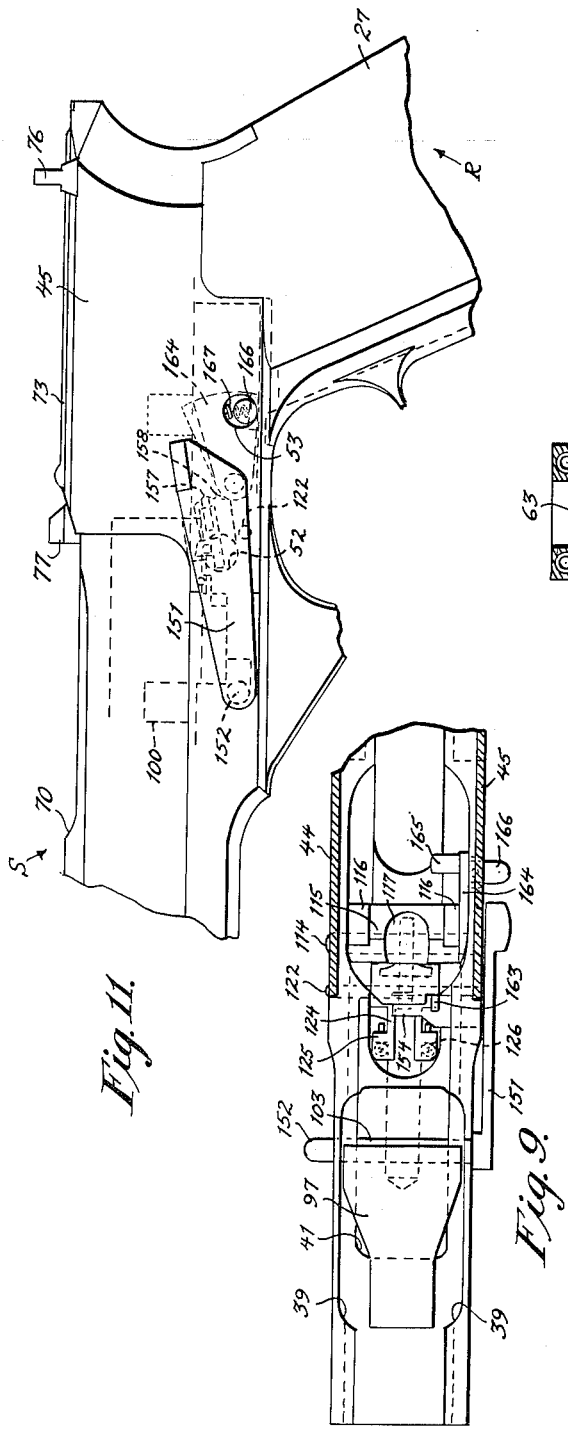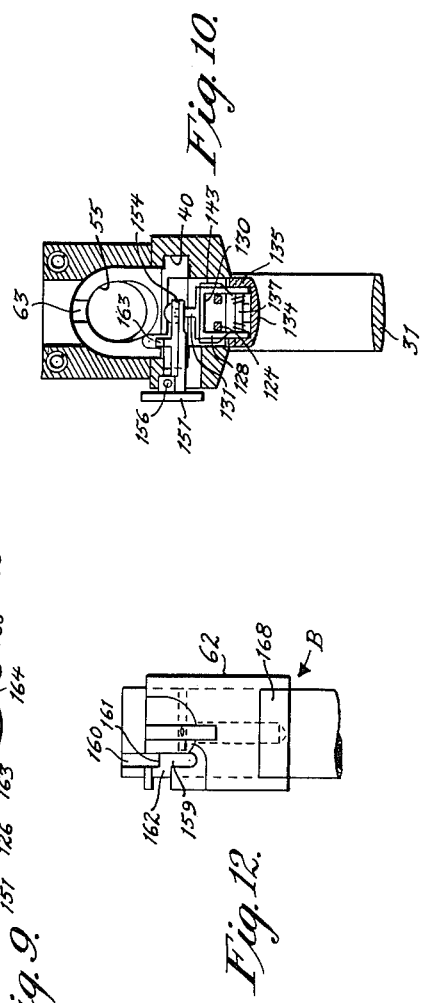

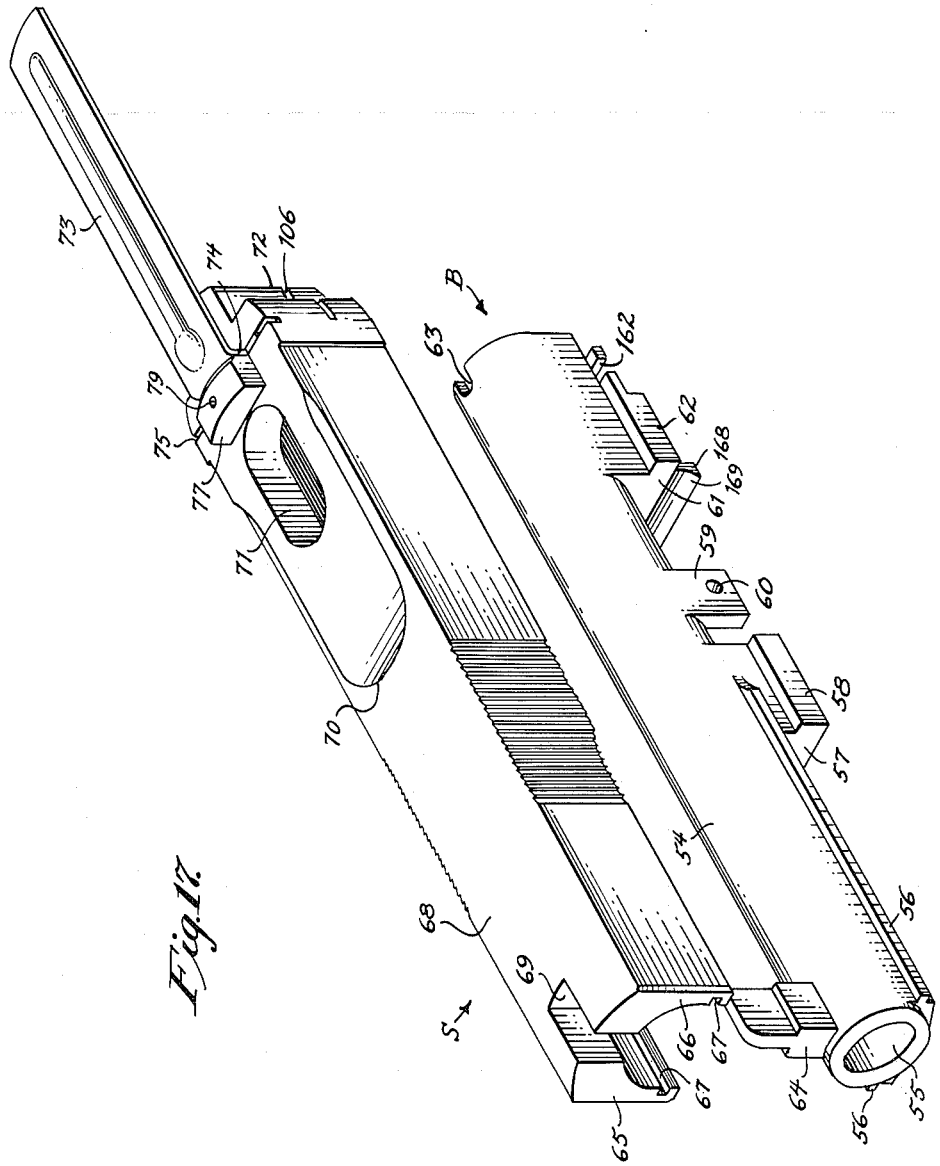

March 21, 1961

G. A. WILSON 2,975,680

SEMIAUTOMATIC PISTOL WITH BREECH BLOCK
FORWARD OF MAGAZINE CHAMBER

Filed April 22, 1958

INVENTOR.
GEORGE A. WILSON
BY
ATTORNEYS.

March 21, 1961     G. A. WILSON     2,975,680
SEMIAUTOMATIC PISTOL WITH BREECH BLOCK
FORWARD OF MAGAZINE CHAMBER
Filed April 22, 1958                                      7 Sheets-Sheet 7

INVENTOR.
GEORGE A. WILSON
BY
ATTORNEYS.

United States Patent Office 2,975,680
Patented Mar. 21, 1961

2,975,680

SEMIAUTOMATIC PISTOL WITH BREECH BLOCK FORWARD OF MAGAZINE CHAMBER

George A. Wilson, 15 War Admiral Lane, R.D. 26, Media, Pa.

Filed Apr. 22, 1958, Ser. No. 730,231

3 Claims. (Cl. 89—196)

The present invention relates to semiautomatic pistols and is concerned primarily with a novel design which provides for the user grasping the handle so as to provide a center-line support for the barrel in resisting the recoil.

In present-day conventional designs of semiautomatic pistols, a hand grip is included which is located below the center line of the barrel. This is necessarily true because provision must be made to allow the breechblock as it recoils to slide rearwardly over the shooter's hand when the pistol is fired. Since the recoil thrust occurs at the center line of the barrel as the bullet moves, and the hand is resisting this thrust below the center line of the barrel, the pistol will tend to rotate about the hand as a pivot and the muzzle of the pistol will flip upwardly.

The foregoing arrangement has been recognized as undesirable by competitive target shooters, and attempt has been made to remedy the unsatisfactory condition by utilizing muzzle brakes which deflect the gases upwardly as they leave the muzzle behind the bullet and thus counteract the tendency of the barrel to rotate upwardly. However, these devices have not exhibited a high degree of effectiveness to achieve the desired end, and often contribute to inaccuracy due to the build-up of fouling in the bullet passage.

With the foregoing conditions in mind, the present invention has in view as its foremost objective the provision of a semiautomatic pistol which includes a hand grip the upper portion of which is in direct alignment with the center line of the barrel, and which when grasped by the user provides a support or base for resisting the recoil which is in line with the barrel.

Prior to the advent of this invention, designers of semiautomatic pistols of the type with which this invention is concerned have been governed by the fallacy that it is necessary to locate the hand grip below the center line of the barrel in order to accommodate the rearward sliding movement of the breechblock during recoil. In the past, the breechblock would slide over the column of cartridges in the magazine, which is maintained at a fixed height, until the breechblock had mover rearwardly sufficient to clear the magazine; whereupon the column of cartridges would move upwardly under the influence of the magazine spring, and the top cartridge of the column would be caught by the returning breechblock and fed into the chamber. This construction, which heretofore had been looked upon as a necessity, requires the breechblock to be of sufficient length to cover the magazine when the breechblock is fully forward, and therefore required considerable clearance to the rear when the breechblock recoiled.

An important object of the present invention is to provide, in a semiautomatic pistol of the character indicated, a breechblock that is greatly shortened as compared to the breechblocks of conventional design, and which operates on the column of cartridges in the magazine under a novel principle. In accordance with this invention, the shortened breechblock does not hold the column of cartridges depressed, but rather depresses them when it recoils rearwardly and allows the uppermost cartridge to pop up in front of the breechblock in the conventional manner when the breechblock is fully to the rear. The present invention is particularly identified by this shortened breechblock which makes possible locating the upper part of the hand grip in alignment with the center of the barrel, and which also presents other advantages in the magazine action, as will later become apparent.

In prior conventional designs of semiautomatic pistols, and particularly those with hammer-fired actions as compared to striker-fired actions, it has been the practice to locate the hammer and sear assemblies to the rear of this magazine, with the trigger in front of the magazine. Such an arrangement requires lengthy connections between the trigger and the sear, with attending difficulties in achieving accurate fitting without excessive take-up or play between these elements. An important object of the present invention is to provide, in a semiautomatic pistol of the type noted, a sear-and-hammer assembly which is located in front of the magazine closely adjacent to the trigger. This is made possible because of the shortened breechblock.

With the shortened breechblock, the trigger, hammer, and sear parts can be closely and accurately fitted in relation to one another, with an attending improvement in the quality of the trigger pull. Uniformity and crispness of the trigger pull are of the utmost importance to target shooters. Locating the hammer to the front of the magazine requires that the hammer arms straddle the magazine and act on a firing pin spanning the width of the breechblock, as contrasted with conventional designs using round firing pins placed in the center of the breechblock.

Another important object of this invention is to provide, in a semiautomatic pistol of the character indicated, a hammer which includes arms which straddle the magazine and which cooperate with a transverse firing pin which spans the breechblock.

In just about every automatic pistol, the trigger is pivotally mounted. The hammer also must be pivotally mounted; and it is common practice to pivotally mount a device for holding the slide open. An important object of this invention is to provide, in a semiautomatic pistol of the type noted, a common pivot pin for the trigger, the hammer, and the slide hold-open device.

Another object of this invention is to provide, in a semiautomatic pistol of the character indicated, a hammer that is formed with a centrally located inclined surface that is adapted to function as a feed ramp for a cartridge when the hammer is depressed and which guides the cartridge into firing position in the barrel.

In a semiautomatic pistol, it is highly desirable to reduce to an absolute minimum all friction which might be created by upward movement of the cartridges in the magazine. This friction is reduced to an absolute minimum when the cartridges assume a position substantially normal to their direction of movement. However, it is an absolute necessity to dispose the hand grip at an obtuse angle with respect to the barrel; that is, the hand grip has a pitch which lends itself to the convenience and comfort with which it may be used. In the prior designs, it has been deemed necessary to arrange the cartridges substantially parallel to the barrel. Thus, the cartridges are not normal to their direction of movement. An important advantage of the present invention which is tied up with the shortened breechblock and feed ramp in the hammer is that the hand grip may have its necessary comfortable pitch and yet the cartridges assume a position normal to their path of movement because, as the breechblock travels rearwardly during recoil, it passes over the uppermost cartridge and depresses the column. After clearing the uppermost cartridge, it engages therewith and moves this cartridge forwardly over the feed ramp, which guides it into firing position.

Another important object of the present invention is to provide, in a semiautomatic pistol of the character noted, a new and improved ejector. This ejector comprises a pair of ejector arms which are located just above the hand grip at the rear of the bottom line of the barrel and with which cooperates an extractor in the form of a pivotally mounted hook that engages an annular groove in the cartridge at the top. During recoil, this extractor moves the empty cartridge casing rearwardly until it strikes the twin ejector arms. At this moment, the cartridge case is supported at three points; namely, by the extractor and the two ejector arms. This provides for accuracy in the ejecting movement and makes possible the use of a small ejection port.

Still another object of the invention is to provide a new and improved automatic locking device for locking the barrel and slide together during the beginning of the recoil, and which is automatically operable to unlock at the proper point of the recoil action to permit the slide to move independently of the barrel.

Still another object of the invention is to provide, in a semiautomatic piston of the character aforesaid, a new and improved safety which is also designed to function as a key for controlling disassembly of the mechanism. Detailed features of this safety will later become apparent.

Still another object of the invention is to provide, in a semiautomatic piston of the type noted, a new and improved mounting for the slide on the receiver. This mounting insures that the slide cannot be blown to the rear to injure the shooter. Moreover, it permits the barrel to be mounted directly on the receiver, which makes for the greatest accuracy by permitting the sights to be mounted on the barrel and receiver, respectively, in permanent alignment.

Various other more detailed objects and advantages of the invention, such as arise in connection with carrying out the above-noted ideas in a practical embodiment, will in part become apparent and in part be hereinafter stated as the description of the invention proceeds.

The invention therefore comprises a semiautomatic piston which is characterized by a hand grip the upper portion of which is in direct alignment with the center line of the barrel, with the construction being made possible by a shortened breechblock, together with attending improvements involved in locking the sear-and-hammer assembly in front of the magazine, and a novel friction-free feed of cartridges from the magazine to firing position.

For a full and more complete understanding of the invention, reference may be had to the following description and accompanying drawings, wherein:

Figure 1 is a view in side elevation of a semiautomatic pistol designed in accordance with the precepts of this invention and depicting how the hand grip is grasped by a shooter;

Figure 2 is a side view taken as a longitudinal vertical section through the pistol shown in Figure 1;

Figure 3 is a detailed horizontal section through the upper portion of the receiver and is taken about on the plane represented by the line 3—3 of Figure 2;

Figure 4 is a detailed sectional view taken on the same plane as Figure 2, showing the slide in its limits-of-recoil position and the corresponding position of the hammer and sear. In this view, the safety is shown in an impossible position for purposes of illustration, as will be later described;

Figure 5 is a transverse vertical section taken about on the plane represented by the line 5—5 of Figure 2;

Figure 6 is a top plan view with parts being indicated in broken lines and with other parts broken away and shown in section;

Figure 7 is a view in front elevation of the barrel and slide;

Figure 8 is a detailed top plan of the safety, with a portion of the receiver being shown in section;

Figure 9 is another detailed top plan of the receiver, with the slide an barrel removed and a part of the receiver shown in section;

Figure 10 is a detailed transverse vertical section with the breechblock removed, and is taken about on the plane represented by the line 10—10 of Figure 2;

Figure 11 is a detailed side elevation illustrating the safety and slide hold-open device;

Figure 12 is a detailed bottom plan of the rear part of the barrel;

Figure 13 is a transverse vertical section taken about on the plane represented by the line 13—13 of Figure 2;

Figure 14 is a detail partly in elevational and partly in section, being taken about on the plane represented by the line 14—14 of Figure 2;

Figure 15 is a cross section through the hand grip, being taken about on the plane represented by the line 15—15 of Figure 2;

Figure 16 is a transverse vertical section through the upper portion of the receiver, being taken about on the planes represented by the line 16—16 of Figure 2;

Figure 17 is a perspective view depicting the slide and barrel in exploded relation;

Figure 18:
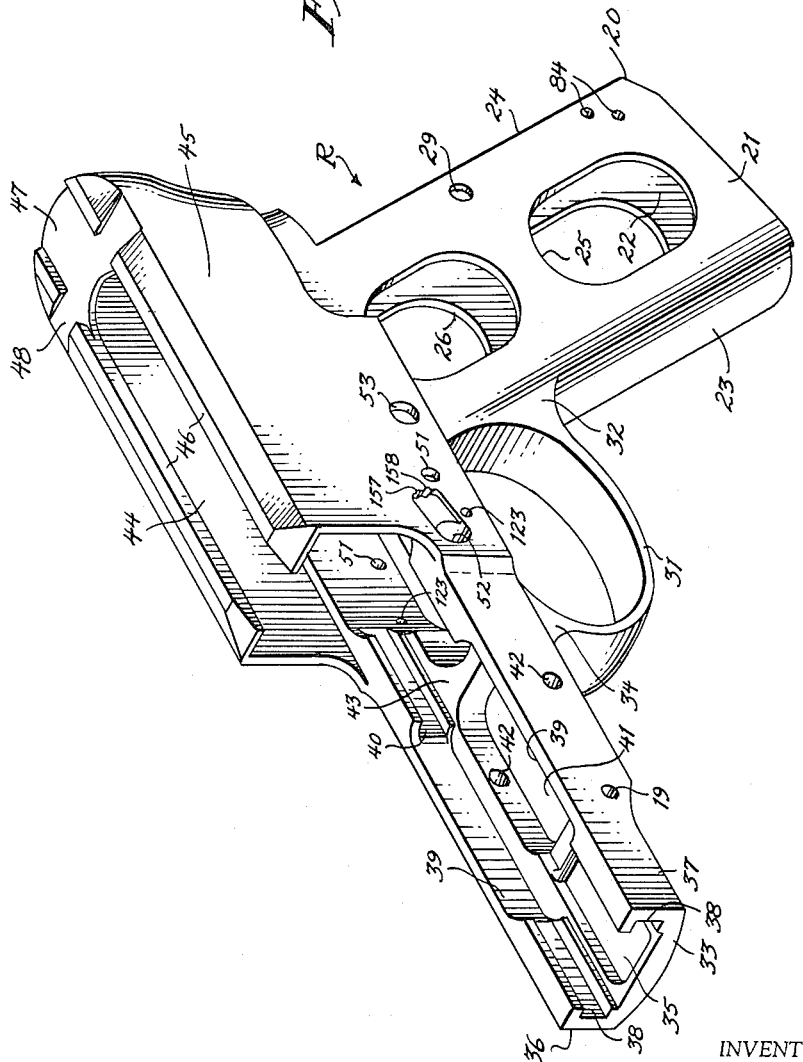
Figure 18 is a perspective of the receiver, per se.

Referring to the drawings, it will be noted that the semiautomatic piston of this invention includes three main and essential elements. These are the receiver, the slide, and the barrel.

Referring now more particularly to the drawings, wherein like reference characters denote corresponding parts, and first more particularly to Figure 18, the receiver is therein illustrated and referred to in its entirety by the reference character R. The receiver R is made of metal and comprises a casinglike structure 20 made up of side walls 21 and 22, and a front wall 23, all integrally joined. The side walls 21 and 22 are thickened as represented at 24, leaving a recess or slot opening to the rear. The side walls 21 and 22 are formed with cutouts 25 and 26 which lighten the construction. The wooden hand grip is applied over the side walls 21 and 22 and rear slot 24 as illustrated in Figures 2 and 15. This wooden hand grip is designated 27 and is secured in position by a bolt 28 which is passed through aligned openings 29 formed in the thickened portions 24 of the side walls 21 and 22. A bushing 30 is interposed between these thickened portions of the side walls 21 and 22 and serves as a spacer to add rigidity to the structure.

A trigger guard 31 has one end integrally joined to the front wall 23, as represented at 32; and its upper forward end is integrally joined to a forwardly extending portion of the receiver that is identified at 33, as indicated at 34.

The forwardly extending portion of the receiver 33 comprises a bottom wall 35 and side walls 36 and 37. The side walls 36 and 37 are formed with inwardly opening channels 38 which receive guide ribs on the barrel, as will be later described. These front channels 38 terminate in side recesses 39 and are continued as rear channels 40 over the trigger guard 31.

The bottom wall 35 is cut out to form a recess at 41; and the walls 36 and 37 are formed with aligned openings 42 on the opposite sides of this recess for a safety lever to be later described. The bottom wall 35 of the receiver terminates at a crosspiece 43. To the rear of this there is no continuation of the bottom wall, leaving an open space between the side walls 36 and 37.

The side walls 36 and 37 are formed with side extensions at 44 and 45 which extend upwardly over the casing 20 and the rear part of the trigger guard 31. The upper edges of these side walls 44 and 45 are formed with inwardly extending flanges 46 which function as a retainer for the slide, as will be later described. At the rear, the side walls 44 and 45 are connected by a top wall 47, with the flanges 46 being provided with cross recesses 48 for receiving a sight, as will be later described. Below this top wall 47, and extending between the side-wall extensions 44 and 45 at their rear ends, is a rear wall 49 providing an abutment surface which is shown in broken lines at 50 in Figure 6.

The side-wall extensions 44 and 45 are formed with aligned openings 51 for accommodating a pivot pin, as will be later described. The side-wall extension 45 is formed with an opening at 52 for accommodating a safety lever, as will be later described, an an opening at 53 for a slide hold-open device, as will be later described. Another hole 19 extends between the side walls 36 and 37 at the front end for accommodating a cam pin.

Referring now more particularly to Figure 17, the barrel is therein illustrated and referred to in its entirety by the reference character B; while the slide is shown at S. The barrel B comprises a cylindrical tubular main body portion 54 having a bore 55. Extending outwardly from the lower sides of the tubular portion 54 of the barrel are guide ribs 56 which are received in channels formed in the slide, as will be later described. Depending from the tubular portion 54 of the barrel B is a block 57 formed with outwardly extending guide ribs 58 which are received in the forward channels 38 of the receiver. To the rear of this block 57 are a pair of depending ears 59 formed with aligned openings 60 which receive a pin of the barrel and slide lock, as will be later described. To the rear of these ears 59 is a rear block 61 having outwardly extending guide ribs 62 which are received in the rear guide channels 40 of the receiver. At the top of the rear end of the barrel is a notch 63 for accommodating an extractor, which will later be described. Mounted on the front end of the tubular portion 54 of the barrel is a sight 64.

The slide S comprises side walls 65 and 66 which have a shape corresponding to the upper contour of the tubular portion 54 of the barrel which they encompass. Adjacent to their lower edges, side walls 65 and 66 are formed with channels 67 which receive the guide ribs 56 on the barrel B. The slide S also includes a top wall 68 which is cut out at its front end as indicated at 69 to accommodate the sight 64. This top wall 68 is reduced in thickness at the shoulder 70, and to the rear of this shoulder 70 is formed with an ejection port 71. The slide S is formed with a rear end wall at 72 having a curvature corresponding to the surface 50 on the rear end wall of the receiver with which it cooperates in providing an abutment limiting rearward movement of the slide. A slide extension 73 is formed at its front end with a downwardly extending flange 74 which is received in a cross groove 75 formed in the top wall 70 of the slide. This slide extension 73 normally closes the open space between the inwardly extending flanges 46 on the side-wall extensions 44 and 45 of the receiver R. As shown in Figure 2, a rear sight 76 is mounted in the cross recesses 48 of the receiver; and the slide extension 73 passes beneath this sight. Just in front of the cross groove 75 there is a block 77 which is internally recessed as indicated at 78 in Figure 2, with a hole 79 extending through the top wall thereof. An indicator pin 80 projects through this hole and is spring biased into its lowermost position by an expansion coil spring 81 received in the recess 78 which bears against a shoulder formed by enlarging the lower end of the pin 80. This pin 80 is normally held depressed by the spring; but when a cartridge is moved into firing position, it is forced upwardly, as will be later described, to indicate this condition.

A removable magazine is referred to in its entirety by the reference character M, and is shown in Figure 2 as being positioned within the casing 20. It is detachably held in this position by a detent 82 which is pivotally mounted on a pin 83, which is in turn mounted in openings 84 formed in the side walls 21 and 22 of the casing 20. This detent 82 is formed with a bore 85 which receives an expansion coil spring 86. One end of this expansion coil spring 86 bears against the lower end of the recess 85; while its upper end bears against a pin 87 that is mounted in the openings in the casing 20. It is evident that the spring 86 exerts a tendency normally holding the detent 82 in position in which the magazine M is held within the casing 20.

The magazine M is of a conventional construction and includes a plurality of cartridges 88 that are spring biased upwardly. Each of the cartridges 88 includes a casing that is formed with an annular groove 89 at its rear end.

Referring now more particularly to Figures 2 and 3, a pair of ejector arms 90 are shown as mounted on the receiver R above the casing 20. The breechblock of the slide, which is constituted by the rear wall 72 and shown in Figures 2 and 4, has pivotally mounted thereon as indicated at 92 an extractor in the form of a hook 93 which engages the groove 89 in the cartridge case. When a cartridge 88 is moved into firing position as shown in Figure 2, the extractor 93 is forced upwardly to urge the indicating pin 80 upwardly into the position in which it indicates the presence of a cartridge in firing position. Upon recoil, the slide S moves to the rear. Thus the breechblock 91 pulls the empty cartridge case rearwardly until the lower portions thereof strike the ejector arms 90. As this action takes place, the empty cartridge case is ejected upwardly through the ejector port 71.

As shown more clearly in Figure 6, the top wall 68 of the slide S is formed at each side with longitudinally extending recesses 94 in which are received recoil springs 95. The receiver R carries a pair of rods 96 (Figure 16) which bear against these springs 95 at their rear ends. Thus, as recoil takes place, the springs 95 are compressed so that, after engagement of the abutment surfaces 50 and 72, the slide is returned to its forward position.

Just as the shot is fired, and during beginning of recoil, it is desirable that the barrel and slide be locked together and then unlocked so that the slide may complete the recoil movement independently of the barrel. For this reason, a lock 97 is provided. This lock takes the form of a lever which is pivotally mounted between the ears 59 on a pin 98, which is in turn mounted in the openings 60 in the ears 59 of the barrel B. At the rear end the lever 97 is formed on its opposite sides with upwardly extending lugs 99 (Figure 2) that are adapted to be received in recesses 100 formed in both sides of the slide. At this same end of the lever 97 there is a downwardly projecting part 101 which provides a cam surface at 102. A pin 103 is fixedly mounted on the receiver R by being anchored in the openings 42. At its forward end and on its underside the lever 97 is formed with another cam surface 104 which cooperates with a pin 105 received in the opening 19.

Figure 2 illustrates the condition of the locking lever 97 at the moment a short is fired. In this position, the lugs 99 are engaged in the recesses 100 in the slide; and the barrel and slide are locked together. Upon recoil, the slide and barrel move rearwardly together until the cam surface 104 rides over the pin 105. As this action takes place, the forward end of the lever 97 is raised and the rear end lowered to move the lugs 99 out of the recesses 100 and permit the slide to continue its recoil independently of the barrel. After the recoil is completed, and upon forward movement of the slide, the cam surface 102 will ride over the pin 103 to again raise the lugs 99 on the rear end of the lever into locking position.

The breechblock 72 of the slide is formed with a transverse slot 106 in which is mounted a transverse firing pin 107. This firing pin is shown in Figure 3 and includes a central pin proper 108 which is received in a correspondingly shaped opening that extends from the slot 106 entirely through the breechblock. It is the pin 108 which actually engages the rear end of the cartridge case 88 to fire the cartridge. A pair of pins 109 bear against shoulders 110 formed on the firing pin 107, and are slidably mounted in bores 111 formed in opposite sides of the slide. Expansion coil springs 112 are located in the forward parts of these bores 111, and constantly urge the firing pin rearwardly.

Figure 19:
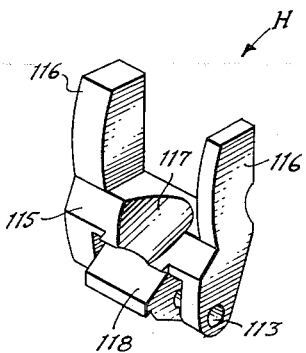
Figure 19 is a perspective view of the hammer, per se.
Figure 20:
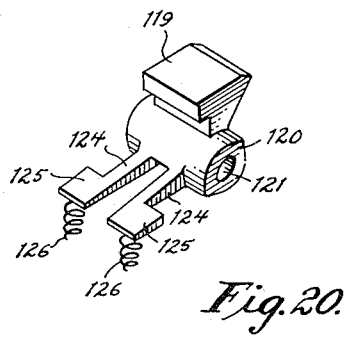
Figure 20 is a detailed perspective of the sear.

A hammer is referred to in its entirety by the reference character H, and is shown in detail in Figure 19. The hammer H includes a transverse bore 113 which receives a pivot pin 114 that is mounted in the openings 51 in the receiver R. The hammer H includes a central main body portion 115 from which upstands a pair of arms 116 which straddle the magazine M and the rearmost part of the breechblock 72 and engage the opposite ends of the firing pin 107. The central portion 115 of the hammer H is recessed to provide a groove 117 which functions as a ramp over which a cartridge 88 rides when the hammer is depressed as illustrated in Figure 4. Extending forwardly from the central portion 115 of the hammer is a locking tongue 118 which is adapted to be engaged by a sear 119 to hold the hammer in its depressed or cocked position. The sear 119 is carried by a hub 120 having a transverse bore 121 which receives a pivot pin 122 that is mounted in the openings 123 (Figure 18) formed in the receiver R. Extending forwardly from the hub 120 are a pair of arms 124, the forward ends of which are formed with outwardly extending ears 125. (See Figure 20.) Engaging the underside of these ears 125 to urge the arms 124 upwardly are a pair of coil springs 126 that are positioned in recesses 127 formed in the trigger guard 31. (See Figure 2.)

Figure 21:
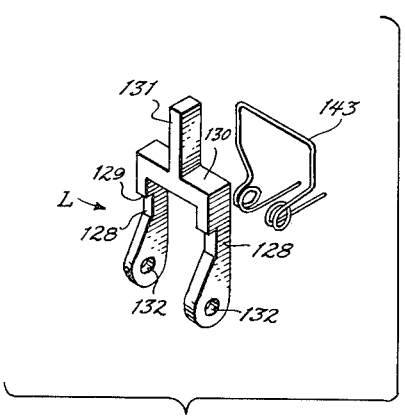
Figure 21 is a perspective of the disconnect lever and its actuating spring in exploded relation.

A disconnect lever is shown in detail in Figure 21, and is referred to in its entirety by the reference character L. This disconnect lever L comprises a pair of arms 128 each having downwardly exposed shoulders 129 which engage the ears 125 on the arms 124 of the sear. The arms 128 are joined at the top by a crosspiece 130; and upstanding centrally therefrom is a projection 131 which cooperates with a disengaging plunger as will be later described.

Figure 22:
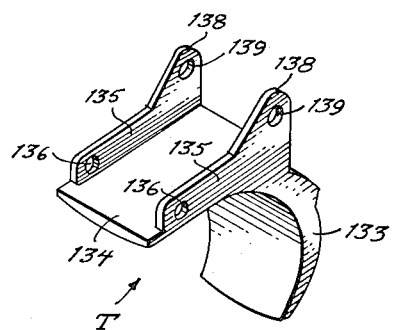
Figure 22 is a detailed perspective of the trigger.

The lower ends of the arms 128 are formed with aligned openings 132. A trigger is illustrated in detail in Figure 22 and is referred to in its entirety by the reference character T. It includes a finger-engaging element 133 and a top piece 134. Extending upwardly from the opposite side edges of the later are a pair of side flanges 135 the forward ends of which are formed with aligned openings 136. The lower ends of the arms 128 are received between these flanges 135, with the openings 132 aligning with the openings 136. A pin 137 passes through these aligned openings and serves to pivotally connect the disconnect lever L to the trigger T. Where the top piece 134 merges in with the finger-engaging part 133, the flanges 135 are formed with upwardly extending ears 138 formed with openings 139 which receive the pivot pin 114. Thus the trigger T is pivotally mounted on the same pivot pin as the hammer H.

It is evident that as a shot is fired the recoil moves the breechblock 72 rearwardly to depress the hammer H into the position depicted in Figure 4. In this position the sear 119 engages the central projection 118 on the hammer to hold the hammer cocked. Moreover, a plunger 140, which is shown in Figure 4 and which is spring biased rearwardly by an expansion coil spring 141 that is mounted in a recess 142 formed in the barrel, engages the projection 131 on the disconnect lever L to move the latter rearwardly into a position in which the shoulders 129 are out of engagement with the ears 125. Thus, any continued pressure on the trigger will have no effect on the sear. However, when the barrel and slide move forwardly after recoil and under influence of the springs 95, the plunger 140 moves with it to permit the disconnect lever 129 to again move forwardly under the influence of a wire spring 143 that is mounted on the pin 137. Thus, the shoulders 129 are again brought into effective engagement with the ears 125. The trigger T must be released before the shoulders 129 will again engage the ears 125 to render the disconnect lever L effective. When pressure is exerted on the finger piece 133 of the trigger T, the latter is rotated to exert a downward pull on the disconnect lever L. This moves the sear 119 out of locking engagement with the projection 118 on the hammer H to allow the latter to be fired under the influence of an expansion coil spring 144 which is received in a socket 145 formed in the forward end of the trigger guard 31. The firing spring 144 is rendered effective through a plunger 146 which is connected by a link 147 to the hammer H as indicated at 148 in Figure 4.

Referring now more particularly to Figure 2, it will be noted that the trigger T is formed with a recess at 149 which receives one end of an expansion coil spring 150. The other end of this spring is recieved in a recess formed in the receiver R. Thus, the finger-grip portion 133 of the trigger T is normally urged forwardly away from the hand grip by this spring. It is depressed against the influence of the spring 150.

A safety lever is shown in detail in Figure 8, and is identified by the reference character 151. Formed integrally therewith is a pivot pin 152 which passes entirely through the openings 42 in the receiver and projects out beyond the opposite side as shown in Figure 9. Carried by the safety lever 151 is a tablike arm 153 which is reduced at its inner end to provide a locking tongue 154. The arm 153 extends through the opening 52 in the receiver wall 37; and the projection 154 is adapted to assume a position immediately in front of the sear 119 when the latter is in position holding the hammer cocked as depicted in Figure 4. When the safety lever 151 is depressed, this projection 154 is removed from in front of the sear so that the latter may be operated to fire the hammer.

Carried by the arm 153 immediately adjacent to the lever 151 is a small housing 155 in which is received a spring-biased pin 156. The nose of the latter is adapted to engage either of the notches 157 or 158 formed at one end of the opening 52 in the receiver wall 37. When the pin 156 is in the uppermost notch 157, the safety is yieldably held in safe position. When the pin 156 is in the lowermost notch 158, the safety is off. The end wall of the opening 52 that is formed with these notches 157 and 158 is slightly inclined as shown in Figure 8 to offer yieldable resistance to removal of the safety.

Referring now more particularly to Figure 12, which is a bottom plan of the rear part of the barrel B, it will be noted that the underside of the barrel is formed with a shallow slot at 159 and a higher or deeper slot 160, with the two being seperated by a shoulder 161. The block 62 is formed with a transverse notch 162 (Figures 12 and 17) which communicates with the slot 159. Refering again now to Figure 8, it will be noted that the arm 153 carries an upwardly extending projection 163 which is adapted to travel longitudinally in the slots 159 and 160 or moved laterally through the cross notch 162 when the safety is to be removed. When the safety is in its uppermost safe position, this projection 163 engages the shoulder 161 to prevent rearward movement of the barrel and slide. It is to be remembered that in the forward position the barrel and slide are locked together.

When it is desired to disassemble the barrel, slide, and receiver, as in field stripping, the operator simply moves the barrel and slide together as a unit rearwardly in the receiver, at the same time maintaining pressure on the projecting end of the pin 152. Thus, when the projection 163 comes opposite to the cross notch 162, it will move therethrough, and the entire safety device is withdrawn. The barrel and slide together may then be moved forwardly until the guide ribs 58 clear the channels 38 at the front and the guide ribs 62 are positioned in the side recesses 39. The barrel and slide may then be moved upwardly as a unit because the rear portion of the slide will have cleared the flanges 46. After the barrel and slide has been moved as a unit, the barrel may be pulled out of the slide. This is ordinarily all the disassembly that is required for field stripping. However, if further disassembly is required, it will be noted that the pins 114 and 122 are headed as shown in Figure 9, with the heads being located beneath the safety lever 151. Thus, with the safety lever 151 removed, these headed pins may also be removed. Removal of the safety lever is yieldably resisted by the spring-biased pin 156 engaging the inclined end of the opening 52.

Referring now more particularly to Figure 11, a slide-holding detent is depicted therein broken in lines and is designated 164. This detent has the shape of a segment; and its smaller end is formed with an opening which receives the pivot pin 114 to pivotally mount the detent 164. As shown in Figure 9, the detent 164 carries an inwardly extending arm 165 that is adapted to be engaged by the cartridge follower in the magazine M. As above explained, the magazine is of conventional construction and the details thereof are not herein illustrated. However, it is noted that the column of cartridges is supported at the bottom from a platelike follower that is spring biased upwardly. After the last cartridge has been moved into firing position, the follower will engage the arm 165 to move the detent 164 upwardly so that its upper corner is received in the recess 100 on that side of the slide. This is depicted in Figure 11. Thus the slide is held in open position until a new magazine has been inserted; and the operator depresses the detent 164 through the medium of the finger tab 166 which projects through the opening 53 in the receiver. The opening 53 is somewhat larger than the tab 166 to permit swinging movement of the detent 164. As shown in Figure 11, a small expansion coil spring 167 normally urges the detent 164 downwardly into ineffective position.

Referring now more particularly to Figure 17, it will be noted that a flange 168 depends from the forward end of the block 62. The forward face of this flange is curved as indicated at 169 to impart thereto a contour corresponding to that of the pin 103. Thus, forward movement of the barrel is limited by the engagement of the forward face 169 of the flange 168 with the pin 103. Rearward movement of the barrel is limited by the engagement of the rear face of the flange 168 with the crosspiece 43 on the receiver.

Operation

While the manner in which the semiautomatic pistol of this invention operates is believed to be ascertainable from the illustration of the drawings and description of parts given, it may be briefly outlined as follows:

With a cartridge in firing position and the hammer cocked, the shooter exerts a pull on the finger piece 133 of the trigger T. This pulls the disconnect lever L downwardly to remove the sear from the position in which it restricts firing movement of the hammer. The hammer is thus actuated under the influence of the spring 144 to hit the firing pin and fire the cartridge. As the bullet moves forwardly, recoil takes place, and the barrel and slide, which it is to be remembered are locked together by the lock 97, move rearwardly. Rearward movement of the barrel stops when the flange 168 thereon engages the crosspiece 43 of the receiver. By this time, the projections 99 on the lock 97 will have been withdrawn from the recesses 100 so that the slide continues to move rearwardly. As this rearward movement takes place, the hammer H is moved into cocked position and the breechblock 72 engages the uppermost cartridge 88 in the magazine M.

It is to be remembered that this uppermost cartridge will be disposed at an angle corresponding to the pitch of the handle. Thus it is favorably disposed for engagement by the beveled lower rear end of the breechblock so that it will be depressed by rearward movement of the breechblock.

This rearward movement of the slide continues until the breechblock strikes the surface 50 on the rear wall 49 of the receiver. During this recoil, energy is stored up in the recoil springs 95. Just before completion of rearward movement of the slide, the empty cartridge case is ejected through the port 71 by the combined action of the extractor 93 and twin ejection arms 90. In its rearmost position, the breechblock 72 clears the uppermost cartridge 88, and the latter pops up into position in which it is engaged by forward movement of the breechblock so that it is moved over the ramp 117 in the hammer H and into firing position in the barrel. As this action takes place, the extractor hook 93 engages the groove 89 in the cartridge case, and also the underside of the indicating pin 80, to move the latter upwardly.

It is believed here unnecessary to repeat in detail the operation of the hammer, sear, disconnect lever, and trigger, it being sufficient to point out that during recoil the breechblock 72 moves the hammer into the cocked position illustrated in Figure 4; and the sear is moved into engagement to hold the hammer in this position until such time as the trigger is again pulled.

When it is desired to field strip the pistol, the safety lever is removed in the manner above described; whereupon the barrel and slide as a unit are removed from the receiver and then in turn separated. If further disassembly is desired, the pins 114 and 122 may be removed because the safety which holds these pins in assembled relation will have been removed.

While a preferred specific embodiment of this invention is hereinbefore set forth, it is to be clearly understood that the invention is not to be limited to the exact constructions, mechanisms, and devices illustrated and described, because various modifications of these details may be provided in putting the invention into practice within the purview of the appended claims.

What is claimed is:

1. In a semiautomatic pistol, a receiver including a casing defining a magazine chamber and including a front wall, a part extending forwardly from said casing, side walls on said forwardly extending part, said side walls being continued rearwardly over said casing and having upwardly extending side-wall extensions and a rear wall defining a recoil space over said magazine chamber; a barrel slidably mounted in said forwardly extending part; and a slide mounted on said barrel and having a rear end constituting a breechblock, said breechblock being located forward of said magazine chamber when said slide is in its forwardmost position; said casing, rearwardly continuing side walls, side-wall extensions and rear wall defining a pistol grip with its upper portion in rearward alignment with said barrel.

2. In a semiautomatic pistol, a receiver including a casing defining a magazine chamber and including a front wall, a part extending forwardly from said casing, side walls on said forwardly extending part, said side walls being continued rearwardly over said casing and having upwardly extending side-wall extensions and a rear wall defining a recoil space over said magazine chamber; a barrel slidably mounted in said forwardly extending part; cooperating abutment elements on said barrel and receiver limiting reciprocating movement of said barrel relative to said receiver; and a slide mounted on said barrel and having a rear end constituting a breechblock, said breechblock being located substantially forward of said magazine chamber when said slide is in its forwardmost position; said breechblock and rear wall of the receiver constituting abutment means limiting recoil movement of said slide; said casing, rearwardly continuing side walls, side-wall extensions and rear wall defining a pistol grip with its upper portion in rearward alignment with said barrel.

3. In a semiautomatic pistol, a receiver including a casing defining a magazine chamber and including a front wall, a part extending forwardly from said casing, side walls on said forwardly extending part, said side walls being continued rearwardly over said casing and having upwardly extending side-wall extensions and a rear wall defining a recoil space over said magazine chamber; a barrel slidably mounted in said forwardly extending part; a slide mounted on said barrel and having a rear end constituting a breechblock, said breechblock being located substantially forward of said magazine chamber when said slide is in its forwardmost position; and locking means for locking said barrel and slide together during the first part of recoil and releasing the slide from the barrel during the remainder of recoil movement of said slide; said casing, rearwardly continuing side walls, side-wall extensions and rear wall defining a pistol grip with its upper portion in rearward alignment with said barrel.

References Cited in the file of this patent

UNITED STATES PATENTS

| | | |
|---|---|---|
| 350,565 | Schoening | Oct. 12, 1886 |
| 591,525 | Burgess | Oct. 12, 1897 |
| 1,427,413 | Pieper | Aug. 29, 1922 |
| 1,638,351 | Loomis | Aug. 9, 1927 |
| 2,115,041 | Obregon | Apr. 26, 1938 |
| 2,136,396 | Savage | Nov. 15, 1938 |
| 2,174,971 | Crockett | Oct. 3, 1939 |
| 2,345,077 | Swebilius | Mar. 28, 1944 |
| 2,495,428 | Simonson et al. | Jan. 24, 1950 |
| 2,585,275 | Ruger | Feb. 12, 1952 |
| 2,622,359 | Belleri | Dec. 23, 1952 |
| 2,705,847 | Kramer | Apr. 12, 1955 |
| 2,775,837 | Perry et al. | Jan. 1, 1957 |
| 2,780,881 | Crittendon et al. | Feb. 12, 1957 |
| 2,817,174 | Liedke | Dec. 24, 1957 |
| 2,899,767 | Boudreau | Aug. 18, 1959 |

FOREIGN PATENTS

| | | |
|---|---|---|
| 389,738 | Germany | Feb. 11, 1924 |